United States Patent
Ghosh et al.

(10) Patent No.: US 11,651,227 B2
(45) Date of Patent: May 16, 2023

(54) TRUSTED NEURAL NETWORK SYSTEM

(71) Applicant: SRI International, Menlo Park, CA (US)

(72) Inventors: Shalini Ghosh, Menlo Park, CA (US);
Patrick Lincoln, Woodside, CA (US);
Ashish Tiwari, Menlo Park, CA (US);
Susmit Jha, Redwood City, CA (US)

(73) Assignee: SRI INTERNATIONAL, Menlo Park, CA (US)

( * ) Notice: Subject to any disclaimer, the term of this patent is extended or adjusted under 35 U.S.C. 154(b) by 724 days.

(21) Appl. No.: 16/226,286

(22) Filed: Dec. 19, 2018

(65) Prior Publication Data

US 2020/0111005 A1   Apr. 9, 2020

Related U.S. Application Data

(60) Provisional application No. 62/741,993, filed on Oct. 5, 2018.

(51) Int. Cl.
*G06N 3/08* (2006.01)
*G06N 3/04* (2006.01)
*G06N 3/084* (2023.01)

(52) U.S. Cl.
CPC .......... *G06N 3/084* (2013.01); *G06N 3/0454* (2013.01)

(58) Field of Classification Search
None
See application file for complete search history.

(56) References Cited

U.S. PATENT DOCUMENTS

2017/0364831 A1   12/2017   Ghosh et al.

OTHER PUBLICATIONS

Ren,AdversarialConstraintLearningforStructuredPrediction,arXiv,May 2018 (Year: 2018).*
WongRecurrentAuto-EncoderModelforLarge-ScaleIndustrialSensorSignalAnalysisEANN2018,Jul. 2018 (Year: 2018).*
Amini, Variational Autoencoder for End-to-End Control of Autonomous Driving with Novelty Detection and Training De-biasing, 2018 IEEE/RSJ International Conference on Intelligent Robots and Systems (IROS), Oct. 2018 (Year: 2018).*

(Continued)

*Primary Examiner* — Kakali Chaki
*Assistant Examiner* — Shien Ming Chou
(74) *Attorney, Agent, or Firm* — Shumaker & Sieffert, P.A.

(57) ABSTRACT

In general, the disclosure describes techniques for facilitating trust in neural networks using a trusted neural network system. For example, described herein are multi-headed, trusted neural network systems that can be trained to satisfy one or more constraints as part of the training process, where such constraints may take the form of one or more logical rules and cause the objective function of at least one the heads of the trusted neural network system to steer, during machine learning model training, the overall objective function for the system toward an optimal solution that satisfies the constraints. The constraints may be non-temporal, temporal, or a combination of non-temporal and temporal. The constraints may be directly compiled to a neural network or otherwise used to train the machine learning model.

19 Claims, 9 Drawing Sheets

(56) References Cited

OTHER PUBLICATIONS

Ghosh, et al., Trusted Neural Networks for Safety-Constrained Autonomous Control, Proceedings of the Joint Norkshop of Deep Learning for Safety-Critical Applications in Engineering (DISE1), May 2018 (Year: 2018).*
Loshchilov,OnlineBatchSelectionforFasterTrainingofNeuralNetworks,arXiv,2016 (Year: 2016).*
Serafini,LogicTensorNetworks:DeepLearningandLogicalReasoning fromDataandKnowledge,arXiv,2016 (Year: 2016).*
Goodfellow, Generative Adversarial Nets, arXiv, 2014 (Year: 2014).*
Makhzani,AdversarialAutoencoder,arXiv,May 2016, (Year: 2016).*
Ghosh, Trusted Machine Learning for Probabilistic Models, ICML 2016 (Year: 2016).*
Abbeel, "Inverse Reinforcement Learning," accessed from http://www.cs.berkeley.edu/~pabbeel/cs287-fa12/slides/inverseRL.pdf, CS 287:Advanced Robotics, Oct. 2012, 75 pp.
Annapurreddy, et al., "S-TaLiRo: A Tool for Temporal Logic Falsification for Hybrid Systems*," International Conference on Tools an Algorithms for the Construction and Analysis of Systems, Mar. 2011, pp. 254-257.
Bagnall, "Author Identification Using Multi-headed Recurrent Neural Networks," CoRR, Aug. 2016, 11 pp.
Bar-Hillel, et al., "Learning a Mahalanobis Metric from Equivalence Constraints," Journal of Machine Learning Research, vol. 6, Jun. 2005, pp. 937-965.
Bartocci, et al., "Model Repair for Probabilistic Systems," accessed from http://www3.cs.stonybrook.edu/~grosu/tacas11.pdf, Mar. 2011, 15 pp.
Bartocci, et al., "Data-Driven Statistical Learning of Temporal Logic Properties*," International Conference on Formal Modeling and Analysis of Timed Systems, 2014, pp. 23-37 (Applicant points out, in accordance with MPEP 609.04(a), that the year of publication 2014, is sufficiently earlier than the effective U.S filing date, so that the particular month of publication is not in issue.).
Bertsekas, "Constrained Optimization and Lagrange Multiplier Methods," Athena Scientific, 1996, 410 pp. (Applicant points out, in accordance with MPEP 609.04(a), that the year of publication 1996, is sufficiently earlier than the effective U.S. filing date, so that the particular month of publication is not in issue.).
Chakraborty, et al., "Distribution-Aware Sampling and Weighted Model Counting for SAT," Proceedings of the 28th AAAI Conference on Artificial Intelligence (AAAI), Apr. 2014, 17 pp.
Chakraborty, et al., "On Parallel Scalable Uniform SAT Witness Generation*," Proceedings of the 21st International Conference on Tools and Algorithms for the Construction and Analysis of Systems TACAS), Apr. 2015, 31 pp.
Desjardins, et al., "Natural Neural Networks," Proceedings of the 28th International Conference on Neural Information Processing Systems, NIPS'15, Jul. 2015, 10 pp.
Donze, "On Signal Temporal Logic," Feb. 2014, 113 pp. (EECS294-98_Spring2014_STL-Lecture).
Fremont, "Maximum Model Counting," Proceedings of the 31st AAAI Conference on Arlilicial Intelligence (AAAI), Feb. 2017, 8 pp.
Ghosh, et al., "Logic-Enforced Multi-headed Neural networks (LEMUN)," (SRI Document 17-433W ECU), Mar. 2017, 15 pp.
Ghosh, et al., "TNN: Trusted Neural Networks for Safety-Constrained Autonomous Control (Slides)," Proceedings of the Joint Workshop of Deep Learning for Safety-Critical Applications in Engineering (DISE1), May 2018, 21 pp.
Ghosh, et al., "Trusted Machine Learning for Probabilistic Models," International Conference on Machine Learning (ICML), 2016, 5 pp. (Applicant points out, in accordance with MPEP 609.04(a), that the year of publication 2016, is sufficiently earlier than the effective U.S. filing date, so that the particular month of publication is not in issue.).
Ghosh, et al., "Trusted Neural Networks for Safety-Constrained Autonomous Control," Proceedings of the Joint Workshop of Deep Learning for Safety-Critical Applications in Engineering (DISE1), May 2018, 10 pp.
Hermanns, et al. "Probabilistic CEGAR*," accessed from http://www.cs.ox.ac.uk/people/bjoern.wachter/papers/cav08.pdf, Jul. 2018, 12 pp.
Hu, et al., "Harnessing Deep Neural Networks with Logic Rules," CoRR, Mar. 2019, 20 pp.
Jha, et al., "Safe Autonomy Under Perception Uncertainty Using Chance-Constrained Temporal Logic," Proceedings of the 8th International Symposium on NASA Formal Methods—vol. 9690, Jun. 2016, 20 pp.
Kotlowski, et al., "Rule Learning with Monotonicity Constraints," Proceedings of the 26th International Conference an Machine Learning, Jun. 14-18, 2009, 8 pp.
Laxton, et al., "Leveraging temporal, contextual and ordering constraints for recognizing complex activities in video," IEEE Conference on Computer Vision and Pattern Recognition, Jun. 2007, 8 pp.
Maler, et al., "Monitoring Temporal Properties of Continuous Signals*," Formal Techniques, Modelling and Analysis of Timed and Fault-Tolerant Systems, Jan. 2004, 16 pp.
Mei, et al., "Robust RegBayes: Selectively Incorporating First-Order Logic Domain Knowledge into Bayesian Models," Proceedings of the 31st International Conference on Machine Learning, Jan. 2014, 9 pp.
Miller, et al., "The Role of Constraints in Hebbian Learning," Neural Computation, vol. 6, No. 1, 1994, 26 pp. (Applicant points out, in accordance with MPEP 609.04(a), that the year of publication 1994, is sufficiently earlier than the effective U.S. filing date, so that the particular month of publication is not in issue.).
Raedt, et al., "Constraint Programming for Data Mining and Machine Learning," Proceeding of the 24th AAAI Conference on Artificial Intelligence (AAAI) Jul. 2010, 5 pp.
Richardson, et al., "Markov logic networks," Machine Learning, vol. 62, Jan. 2006, pp. 107-136.
Sadigh, et al., "A Learning Based Approach to Control Synthesis of Markov Decision Processes for Linear Temporal Logic Specifications," accessed from http://www.eecs.berkeley.edu/~dsadigh/Papers/sadigh-cdc2014.pdf, Sep. 2014, 9 pp.
Sadigh, et al., "Data-Driven Probabilistic Modeling and Verification of Human Driver Behavior," Technical Report No. UCB/EECS-2013-197, accessed from http://www.eecs.berkeley.edu/~dsadigh/Papers/sadigh-cdc2014.pdf, Dec. 2013, 8 pp.
Serafini, et al., "Logic Tensor Networks: Deep Learning and Logical Reasoning from Data and Knowledge*," CoRR, Jul. 2016, 12 pp.
Seshia, S. et al., "A Theory of Formal Synthesis via Inductive Learning," accessed from http://arxiv.org/pdf/1505.03953v3.pdf, Nov. 2015, 30 pp.
Towell, et al., "Knowledge-Based Artificial Neural Networks," Artificial Intelligence, vol. 69 or 70, Aug. 1994, 45 pp.
Zhu, "Machine Teaching: An Inverse Problem to Machine Learning and an Approach Toward Optimal Education," Proceedings of the 29th AAAI Conference on Artificial Intelligence, accessed from http://pages.cs.wisc.edu/~jerryzhu/pub/MachineTeachingAAAI15.pdf, Jan. 2015, 5 pp.
Jha, et al., "TeLEx: Passive STL Learning Using Only Positive Examples," retrieved from https://people.eecs.berkeley.edu/~sseshia/pubdir/rv17-telex.pdf, Sep. 13, 2017, 17 pp.
Dietterich, "Constraint Propagation Techniques for Theory-Driven Data Interpretation," PhD Thesis, Stanford University, 1985, 179 pp. (Applicant points out, in accordance with MPEP 609.04(a), that the year of publication, 1985, is sufficiently earlier than the effective U.S. filing date, so that the particular month of publication is not in issue.).

* cited by examiner

TRUSTED NEURAL NETWORK SYSTEM

This application claims the benefit of U.S. Provisional Application No. 62/741,993, filed Oct. 5, 2018, which is hereby incorporated by reference in its entirety.

TECHNICAL FIELD

This disclosure is related to machine learning systems, and more specifically to artificial neural networks.

BACKGROUND

Machine Learning (ML) typically involves training a machine learning model with training data to produce a trained model able to generalize properties of data based on similar patterns with the training data. Training the model often involves learning model parameters by optimizing an objective function, thus optimizing a likelihood of observing the training data given the model. For some applications, in addition to minimizing the objective function, a trained model may need to satisfy additional properties that are important for the domain.

SUMMARY

In general, the disclosure describes techniques for facilitating trust in neural networks using a trusted neural network system. For example, described herein are multi-headed, trusted neural network systems that can be trained to satisfy one or more constraints as part of the training process, where such constraints may take the form of one or more logical rules and cause the objective function of at least one the heads of the trusted neural network system to steer, during machine learning model training, the overall objective function for the system toward an optimal solution that satisfies the constraints. The constraints may be non-temporal, temporal, or a combination of non-temporal and temporal. The constraints may be directly compiled to a neural network or otherwise used to train the machine learning model.

In some examples, the techniques may include training a multi-headed, trusted neural network system, as described herein, using proximal gradient techniques. For instance, the training may include updating parameters in two steps: a first step to move along in the direction of the gradient of the loss function and a second step to do a proximal mapping of a function that specifies the constraints for the trusted neural network system.

The techniques may provide one or more technical advantages. For example, the multi-headed, trusted neural network system architecture may provide a general framework for combining multiple data sources and different types of logical rules using a combined objective function that evolves naturally from the architecture. As another example, by propagating error from at least one head of the multi-headed neural network system to another head of the system, and using a shared neural network having features shared in common by the multiple heads, the techniques may constrain outputs of the machine learning model to a constrained solution space defined by logical constraints that must be satisfied for the application. In this way, the trusted neural network system architecture may permit the imposition of additional constraints in the system model output, such as constraints enforcing safety properties inherent to the domain, which may improve the trustworthiness of systems that make use of the system model. As another example, using proximal gradient techniques when training a multi-headed, trusted neural network system may improve the convergence speed.

In some examples, a trusted neural network system to provide trusted results in a system comprises: a data head comprising a first neural network, the data head configured to process training data using the first neural network to train a machine learning model; a logic head comprising a second neural network, the logic head configured to process the training data using the second neural network to train the machine learning model according to one or more logical constraints that define a constrained solution space for the machine learning model, wherein the logic head is configured to propagate error directly to the data head using a feedback path between the logic head and the data head, wherein the data head and the logic head share a shared neural network having shared parameters for use by both the data head and the logic head, when training the machine learning model to constrain outputs of the machine learning model to the constrained solution space for the machine learning model; and a computation engine comprising processing circuitry for executing the data head and the logic head to train the machine learning model to produce one or more results that have exceeded a threshold value, wherein the computation engine is configured to execute the data head to apply the machine learning model to input data to generate predicted output for the input data, and wherein the computation engine is configured to output the predicted output for the input data.

In some examples, a method comprises processing, by a data head of a trusted neural network system, training data using a first neural network to train a machine learning model, wherein the data head comprises the first neural network; processing, by a logic head of the trusted neural network system, the training data using a second neural network to train the machine learning model according to one or more logical constraints that define a constrained solution space for the machine learning model, wherein the logic head comprises the second neural network, wherein the logic head is configured to propagate error directly to the data head using a feedback path between the logic head and the data head, wherein the data head and the logic head share a shared neural network having shared parameters for use by both the data head and the logic head, when training the machine learning model, to constrain outputs of the machine learning model to the constrained solution space for the machine learning model; applying, by the data head, the machine learning model to input data to generate predicted output for the input data; and outputting, by the trusted neural network system, the predicted output for the input data.

In some examples, a computing system comprises: a memory; and one or more processors coupled to the memory, wherein the one or more processors are configured to: process, with a data head, training data using a first neural network to train a machine learning model, wherein the data head comprises the first neural network; process, with a logic head, the training data using a second neural network to train the machine learning model according to one or more logical constraints that define a constrained solution space for the machine learning model, wherein the logic head comprises the second neural network, wherein the logic head is configured to propagate error directly to the data head using a feedback path between the logic head and the data head, wherein the data head and the logic head share a shared neural network having shared parameters for use by both the data head and the logic head, when training the machine learning model to constrain outputs of the machine learning model to the constrained solution space for the machine learning model; apply, with the data head, the machine learning model to input data to generate predicted output for the input data; and output, with the trusted neural network system, the predicted output for the input data.

The details of one or more examples of the techniques of this disclosure are set forth in the accompanying drawings and the description below. Other features, objects, and advantages of the techniques will be apparent from the description and drawings, and from the claims.

BRIEF DESCRIPTION OF DRAWINGS

Like reference characters refer to like elements throughout the figures and description.

DETAILED DESCRIPTION

The notion of trust for systems that operate autonomously or semi-autonomously, such as robotic systems, autonomous vehicle systems, healthcare systems, financial systems, and cybersecurity systems, relates to the ability of such systems to achieve certain guarantees of operation by the systems. For example, a machine learning system that provides trusted operations is one in which the machine learning model is trained not only to attempt to maximize the likelihood of observing the training data but that is also trained to satisfy some additional properties that are important for the system domain.

The additional properties may be safety properties or other constraints inherent in the system domain. For example, when driving along a straight road, the autonomous controller for an autonomous vehicle system should not cross a double-yellow line. As another example, a medical transcription tool that is faced with ambiguity when translating text should avoid translating the text to reach a result (e.g., drug dosage) outside of safe drug prescription boundaries. Domain knowledge regarding safe drug prescription boundaries (e.g., of drug dosage levels) can mitigate erroneous transcriptions indicating an unhealthy high dosage for a medication, for instance. As described further herein, a Trusted Neural Network (TNN) has a model that, at least in some examples, includes constraints on the outputs of a deep neural network model as an additional objective that is to be satisfied during training, even when the training data might violate the constraints on some occasions. As a result, the deep neural network model can satisfy safety constraints or other constraints inherent to the system domain for a system that uses the deep neural network model. Improving the likelihood that constraints will be satisfied by the model, in operation, may provide certain guarantees of operations by the system resulting in an improved likelihood of reliable and trusted operation.

Figure 1:
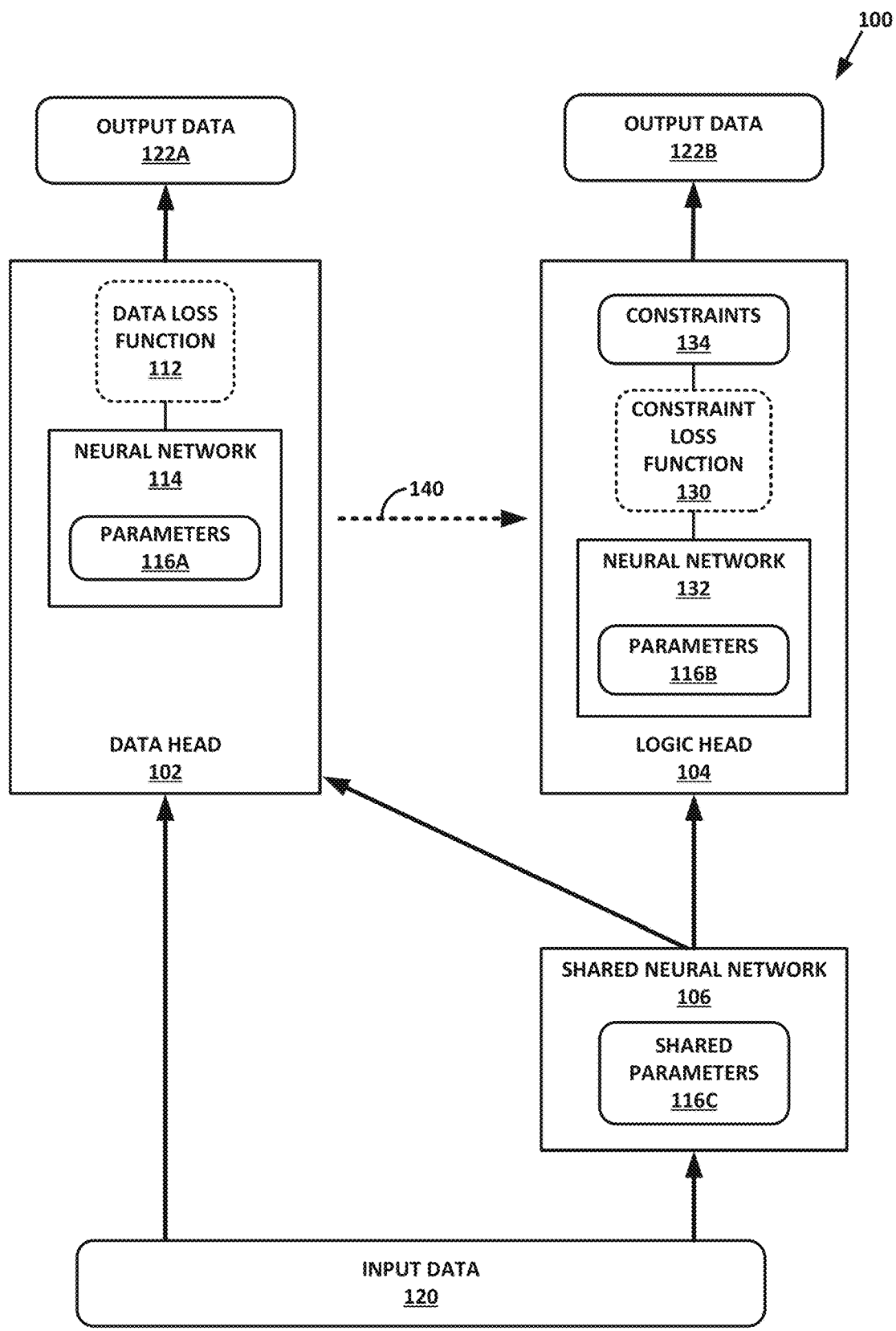
FIG. 1 is a block diagram illustrating an example multi-headed, trusted neural network system in accordance with the techniques of the disclosure.

FIG. 1 is a block diagram illustrating an example multi-headed, trusted neural network (TNN) system 100 in accordance with the techniques of the disclosure. Deep learning methods for training neural networks fit a function (typically non-linear) $f$ between input (i) and output (o') and learn the parameters (weights) w so that the model's output (o') is close to true output (o). The learning part can be posed as an optimization problem, where $l$ is a loss function:

$$\min_{w} l(o, o'), \text{ s.t. } o' = f(w, i)$$

A further constraint may be placed on weights to avoid overfitting, which results in a regularized loss function:

$$\min_{w} l(o, o') + l'(w), \text{ s.t. } o' = f(w, i)$$

where l' is a regularization function. As described herein, to satisfy application constraints, additional constraints may be imposed directly on the models' output, resulting in a constraint loss function:

$$\min_{w} l(o, o'), \text{ s.t. } o' = f(w, i) \text{ and } g(o') \leq 0$$

where g is a function, possibly in first-order logic and/or in (probabilistic) temporal logics, specifying the application constraints (represented in FIG. 1 as constraints 134). As described herein, to achieve a trusted model that satisfies g, TNN system 100 may be trained using backpropagation algorithms that leverages the multi-headed architecture of the TNN system 100 to train on both logical rules and on data to optimize a combined objective function. Alternatively, or additionally, TNN system 100 may be trained using a proximal gradient descent algorithm that performs proximal mapping of a function that specifies the constraints g for the TNN system 100.

TNN system 100 in this example includes a data head 102 and a logic head 104. Data head 102 includes a neural network 114 having parameters 116A. Logic head 104 includes a neural network 132 having parameters 116B. Parameters of a neural network are also known as "weights." Data head 102 may represent a tower of neural layers, including neural network 114 and shared neural network 106. Logic head 104 may represent a tower of neural layers, including neural network 132 and shared neural network 106.

Data head 102 trains on input data 120. Data head 102 may train to optimize the data loss function 112 for minimizing error between the output data 122A (o) and the true outputs (o') for training data of inputs data 120. Data head 102 may include one or more neural network layers. Neural network 114 may include one or more of a Deep Neural Network (DNN) model, Recurrent Neural Network (RNN) model, and/or a Long Short-Term Memory (LSTM) model. In general, DNNs and RNNs learn from data available as feature vectors, and LSTMs learn from sequential data. As used herein, "A and/or B" should be interpreted as "A, B, or A and B."

Logic head 104 may determine whether one or more constraints 134 are satisfied, where constraints 134 represent one or more logical rules that determine the satisfiability of outputs for the logic head 104 based on at least some of input data 120. Constraints 134 may be logical constraints. As such, TNN system 100 may alternatively be referred to as a logic-enforced multi-headed neural network system. Constraints 134 may include constraints according to one or more types of constraints, such as temporal constraints or non-temporal constraints. A temporal constraint is one that must be satisfied by the TNN system 100 machine learning model over time. For example, there may be a safety constraint for an autonomous vehicle that specified that when the vehicle is turning, it should be going at a low speed. Reference to autonomous vehicles may encompass many different degrees of autonomy, e.g., from fully autonomous, to teleop systems, to partially autonomous systems, to warning systems. Logic head 104 may include a model such as Markov Chains or Markov Decision processes that incorporates one or more temporal constraints, which be expressed in Probabilistic Computation Tree Logic (PCTL). Neural network 132 may represent such models.

In some cases, neural network 132 may incorporate temporal logical constraints, such as Signal Temporal Logic (STL). For temporal logical constraints of constraints 134, neural network 132 may be a Logic Tensor Network (LTN) used to determine whether the logical constraints are satisfied.

A non-temporal constraint may express rules that apply to all instances of a certain kind. For example, the first-order constraint $$\forall\{I,C\}[atFourwayIntersection(C,I) \rightarrow reducedSpeed(C)]$$

specifies that for all cars C and four-way intersections I, if the car is at a four-way intersection, the car C should have reduced speed. Logic head 104 may include a model such as Markov logic networks or Bayesian networks to incorporate non-temporal constraints, which may be an equivalent neural network to be able to train jointly with the data head neural network 114.

Logic head 104 may include a Neural Rule Learning (NRL) layer trained to determine whether one or more logic rules Logic head 104 may include one or more neural network layers. Neural network 132 may be directly compiled from constraints 134 or may otherwise depend on constraints 134. In some cases, neural network 132 may include one or more Logic Tensor Networks (LTNs).

The TNN system 100 model that includes logic head 104 may therefore incorporate a rich class (multiple types) of constraints to enable logic-guided data-efficient learning. With respect to data-efficiency, many applications domains in which machine learning models are used suffer from data sparsity issues, especially with respect to supervised data. For example, in the domain of robotics (e.g., automatic car controllers, robotic arm controllers) or cybersecurity (e.g., honeynet controllers), unsupervised data is often available in large quantities, but clean supervised data with reliable labels provided by human annotators is limited. However, supervision is often available in another form in such application domains, namely as a symbolic model. The term "model" in this context may refer not only simulation models but, more generally, to any collection of constraints that restrain the set of admissible data points in the application domain. A typical example is safety constraints, such as one that restrains the possible combinations of the speed of a vehicle and its steering angle at any given time. As described herein, the TNN system 100 may learn while being guided by the model (i.e., model-guided machine learning), where the TNN system 100 model must be learned from (possibly limited) data, but the learning process is constrained by a model in the form of constraints 134.

Data head 102 has an objective function that is data loss function 112. Logic head 104 has an objective function that is constraint loss function 130. The objective functions for the heads 102, 104 may be adapted to the respective problems to be solved by the corresponding heads. Data head 102 and logic head 104 share shared neural network 106 having shared parameters 116C. That is, outputs of shared neural network 106 are inputs to neural network 114 of data head 102 and also inputs to neural network 132 of logic head 104. Shared neural network 106 may in some cases be another layer of neural network 114 and also another layer of neural network 132.

Shared parameters 116C are shared by data head 102 and logic head 104. Data loss function 112 is an objective function $O_1(p_1,p_s)$, where $p_1$ is parameters 116A and $p_s$ is parameters 116C and constraint loss function 130 is an objective function $O_2(p_2,p_s)$, where $p_2$ is parameters 116B. Both loss functions 112, 130 thus depend on shared parameters 116C. Shared parameters 116C may receive gradient updates from both data head 102 and logic head 104. As a result, the model for TNN system 100 may be jointly trained with the combined loss function $O_1(p_1,p_s)+\lambda O_2(p_2,p_s)$, where $\lambda \in \mathbb{R}^+$ is a parameter fixing a trade-off that determines the importance that is given to the rule-based knowledge source represented by the logic head 104.

Put another way, parameters 116A are learned by optimizing the objective function $O_1(p_1)$ (keeping shared parameters 116C fixed during learning). Parameters 116B are learned by optimizing the objective function $O_2(p_2)$ (keeping shared parameters 116C fixed during learning). As a result, the shared parameters 116C are learned by optimizing the combined objective function $O_1(p_s)+\lambda O_2(p_s)$. The $\lambda$ parameter may be configurable and may be applied as a scaling constant to the gradients coming from the logic head 104 and in this determines the trade-off in importance between data head 102 and logic head 104. The techniques may thereby allow a fine-tuned tradeoff between rule constraints and data knowledge, and enables constrained-guided data-efficient learning.

Input data 120 may represent, for example, sensor data generated by a sensor in response to detecting conditions (e.g., location, speed, throttle, heart rate, etc.). Input data 120 may include feature vectors and/or sequential data. Input data 120 may characterize an application domain, such as operations and characteristics of autonomous vehicles or other robotic systems, human movements, robot arm data, financial data, health care data, cybersecurity data, or data for another application domain in which, for instance, additional satisfiability constraints may be specified to drive the learning by TNN system 100. Applications for a TNN system 100 can include autonomous vehicle operation, robotic device operation such as robot arm control, financial applications, health care applications, cybersecurity, and other applications.

Input data 120 may include training data used to train the TNN system 100 model to provide trusted output data 122A and/or trusted output data 122B. Data head 102 processes at least some of input data 120 to train at least one of parameters 116A by optimizing data loss function 112. During learning using backpropagation, for instance, data head 102 propagates error, in the form of gradient updates or other error indication, to shared neural network 106. Shared neural network 106 updates parameters shared parameters 116C using the propagated error from data head 102.

Logic head 104 processes at least some of input data 120 to train at least one of parameters 116B by optimizing constraint loss function 130, which represent one or more logical constraints 134 that define a constrained solution space for the TNN system 100 model. During learning using backpropagation, for instance, logic head 104 propagates error, in the form of gradient updates or other error indication, to shared neural network 106. The logic head 104 updates its parameters 116B. Shared neural network 106 updates shared parameters 116C using the propagated error from logic head 104. In some cases, logic head 104 may process at least some of input data 120 directly, i.e., unmediated by shared neural network 106 to train at least one of parameters 116B. Direct input data to a head of a multi-headed TNN system 100 may be referred to herein as "side input."

Consequently, the shared neural network 106 obtains backpropagated error from both data head 102 and logic head 104 for use in updating shared parameters 116C. During subsequent feed-forward processing, by data head 102, of outputs generated by shared neural network 106 operating on input data 120, the backpropagated error from logic head 104 and used to update shared parameters 116C may result in error propagated from the logic head 104 to the data head 102 when training the TNN system 100. As noted above, logic head 104 is learning to optimize the constrain loss function 130 representing the logical constraints 134. Training TNN system 100 in this way therefore constrains output data 122A determined by the data head 102 to the constrained solution space for the TNN system 100, as determined by logical constraints 134. The TNN system 100 model, thus trained to a found optimum within the constrained solution space, is able to provide trusted results, in the form of predicted output data for subsequent input data, that meet the logical constraints 134.

In some examples, TNN system 100 includes a feedback path 140 in which logic head 104 is configured to receive a predicted output of the data head 102 for use by the logic head 104 to process input data 120 using the logical constraints 134. In this way, error based on differences between the predicted outputs and the true outputs may be directly propagated between the logic head 104 and the data head 102, such as from the logic head 104 to the data head 102. The predicted output of data head 102 may include data from output data 122A that is mapped to data points in constraints 134 and/or mapped to one or more of parameters 116B to configure the feedback path 140.

The trusted results, output data 122A and/or output data 122B, may in some examples be computed to exceed a level of trust defined by a threshold. The threshold value may be configurable. The threshold value may be expressed as a percentage, ranking, or other value that indicates a level of trust that must be satisfied for TNN system 100. The trusted results may, in some examples, be compared to other trusted results from other TNN system 100 configurations to identify a preferred result that exceeds the threshold of the other system 100 configurations. The preferred result in some examples may be determined as the result that is furthest distance from the trust envelope that delineated the constrained solution space (defined by the constraints 134) and the overall solution space for the domain.

TNN system 100 may constrain neural network learning to a constrained solution space using gradient descent. The optimization problem $$\min_w l(o, o'), \text{ s.t. } o' = f(w, i) \text{ and } g(o') \le 0$$

can be projected into dual space as $$\min_w l(o, o') + \lambda g(o')$$
$$\text{s.t. } o' = f(w, i), \lambda \ge 0$$

TNN system 100 in such cases can be trained using a grid search to explore over possible values of hyperparameter $\lambda$ and find the best value. Greater values of $\lambda$ give more significance to g, as represented in FIG. 1 as the constraint loss function 130. In this sense, $\lambda$ is a constraint significance hyperparameter. TTN system 100 may solve the above projected optimization problem using gradient descent, which may include proximal gradient descent. Proximal gradient descent updates the parameters 116 in two steps:

1) $w_{t+\frac{1}{2}} = w_t - \eta_t \partial l(w_t)$

2) $w_{t+1} = \text{argmin}_w \left( \frac{1}{2} \left\| w - w_{t+\frac{1}{2}} \right\|^2 + \eta_t \lambda g(w) \right)$ where in step 1 parameters 116 move along the direction of gradient l and step 2 involves proximal mapping of g. Step 1 may be regular gradient descent and may be implemented using backpropagation. Step 2 is the proximal mapping, and for simple g functions, can involve closed-form proximal mappings. For other g functions, TNN system 100 can perform the backpropagation algorithm to find an approximation. By using proximal gradient descent, TNN system 100 in some examples can speed up convergence of training the TNN system 100 model having the combined loss function from the multiple heads. The equation in step 2 may be a new loss function that is a weighted sum of the original loss function in step 1 and a function representing the constraints. As noted, proximal gradient descent can be used to optimize the new loss function.

Figure 2:
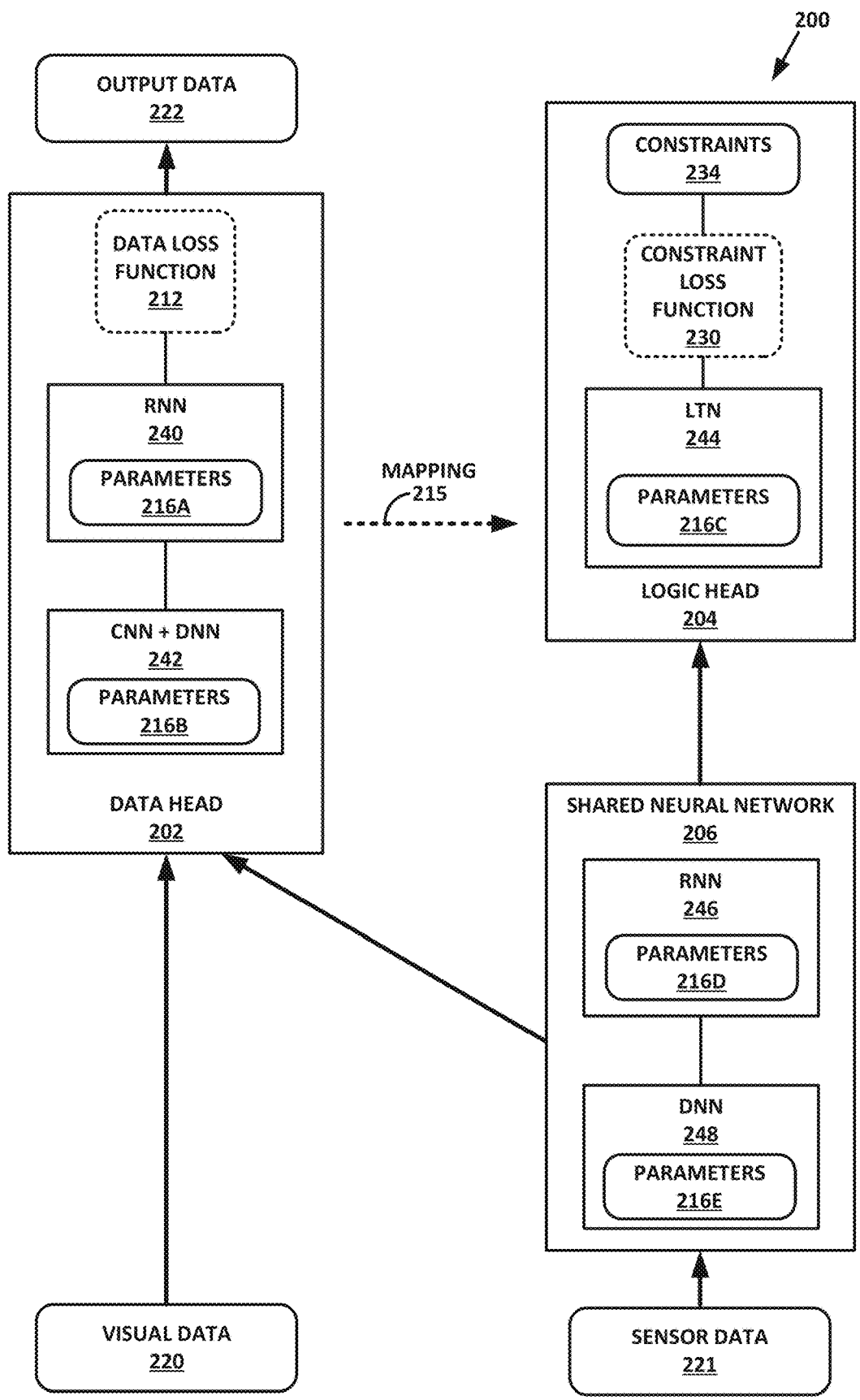
FIG. 2 is a block diagram illustrating an example computing device of the identification system of FIG. 1 in further detail in accordance with the techniques of the disclosure.

FIG. 2 is a block diagram illustrating an example of a trusted neural network system 200 in accordance with the techniques of the disclosure. TNN system 200 may represent an example instance of TNN system 100. Data head 202, logic head 204, and shared network 206 may represent example instances of data 102, logic head 104, and shared network 106, respectively.

Applications for TNN system 200 may include an autonomous vehicle or other robotic device controller. Autonomous vehicle control, for instance, is an example machine learning application in which logical constraints 217 may be used in addition to training data, e.g., from sensors, to produce better and safer models. Sensor data 221 may indicate the distance of the vehicle from obstacles or the edge of a road in a set of directions, speed, distance and angle to center of the road, and so forth. The application of TNN system 200 may be to output data for controlling at least one of acceleration, brake, clutch, gear, and steering angle.

Data head 202 processes visual data 220 and sensor data 221 to predict a direction of a device for which TNN system 200 is operating as a controller. The direction may be a steering angle sequence for an autonomous vehicle, for instance. Data head 202 may further predict an acceleration to learn more precisely the momentum of the device.

In this example, data head 202 includes a neural network model made up of a recurrent neural network (RNN) 240 having parameters 216A, a convolutional neural network (CNN) and dense neural network (DNN) 242 having parameters 216B. The data head 202 model has an objective function that is data loss function 212. Data loss function 212 may involve a mean squared error (MSE) loss function. The data head 202 model shares shared neural network 206 with logic head 204. In some examples, one or more CNN layers of CNN+DNN 242 feed one or more DNN layers of CNN+DNN 242, which together enable CNN+DNN 242 to process visual data 220, which may include an image sequence generated by an image capture device (e.g., a camera or videocamera). CNN+DNN 242 may be made up of one or more ReLu-activated convolutional layers and one or more ReLu-activated dense layers. RNN 240 may be based on an LSTM cell. CNN+DNN 242 may be referred to as a "deep convolutional neural network."

The RNN 240 input may be combined outputs of at least the CNN+DNN 242 and the shared neural network 206. Shared neural network 206 is made up of RNN 246, which may be based on an LSTM cell and having parameters 216D, that receives outputs from a DNN 248 having parameters 216E. The output of shared neural network 206 may is input for both data head 202 and logic head 204.

Logic head 204 includes a Logic Tensor Network (LTN) 244 having optional parameters 216C. In general, Logic Tensor Networks define a language using first-order logic L(C,F,P), where C is the set of constants (data points), F is the function symbols, and P is the predicate symbols. The goal of LTNs may be to learn the function g represented by constraints 234 from both data and rule-based knowledge, which may be specified as first-order logic rules and implemented as constraints 234. A grounding is defined on the language L, mapping logical propositions to their truth values in a range, such as [0,1]. Constants are mapped to numerical vectors; the symbols to be learned are mapped to functions whose parameters may be learned, using gradient descent, to maximum an objective function that is the conjunction of clauses defined over the data points. In such examples of the TNN system 200, the TNN system 200 model may be trained by training neural networks of data head 202 on the data and LTN 244 of logic head 104 on the rules, using a combined loss function.

The functional operators in the one or more LTNs may be mapped to one or more neural networks, such as deep regression neural networks. The one or more LTNs may effectively encode logical functions in a neural network, for which they use real logic defined as follows. Let $\mathcal{G}$ be the grounding used in the real logic framework, and $f$ a real unary operator $f: C \rightarrow \mathbb{R}^p$ that will be mapped to the function $\mathcal{G}(f): \mathbb{R}^d \rightarrow \mathbb{R}^p$. The definition of the grounding $\mathcal{G}$ is extended to a new class of literals using the functional operator $f$, mainly, for a datapoint $x \in C$ and $C \in f(C)$, $f(x)=c$, $f(x) \geq c$, and $f(x) \leq c$ are:

$$\begin{cases} \mathcal{G}(f(x) = c) \in [0, 1] \\ \mathcal{G}(f(x) = c) = 1 \leftrightarrow f(x) = c \end{cases}$$

$$\begin{cases} \mathcal{G}(f(x) \leq c) \in [0, 1] \\ \mathcal{G}(f(x) \leq c) = 1 \leftrightarrow f(x) \leq c \end{cases}$$

$$\begin{cases} \mathcal{G}(f(x) \geq c) \in [0, 1] \\ \mathcal{G}(f(x) \geq c) = 1 \leftrightarrow f(x) \geq c \end{cases}$$

Possibilities include using functions such as:

$$\mathcal{G}(f(x)=c)=1-\exp(\|f(x)-c\|^2) \quad (1)$$

and if $f(C)$ is bounded with a diameter $\delta(C)$:

$$\mathcal{G}(f(x) = c) = 1 - \left\|\frac{f(x) - c}{\delta(C)}\right\|, \text{ or} \quad (2)$$

$$\mathcal{G}(f(x) = c) = 1 - \left|\frac{f(x) - c}{\delta(C)}\right| \quad (3)$$

The function in equation (1) provides very low gradients outside of the truth region, while equation (3) is non-differentiable on 0; equation (2) has functional operators with defined bounds and is used to adapt the other literals as follows:

$$\mathcal{G}(f(x) \leq c) = 1 - \left\|\max\left(\frac{f(x) - c}{\delta(C)}, 0\right)\right\|^2$$

$$\mathcal{G}(f(x) \geq c) = 1 - \left\|\min\left(\frac{f(x) - c}{\delta(C)}, 0\right)\right\|^2$$

To implement bounded regression neural networks for logic head 204, a tanh activation function may be applied for the output layer and the output may be rescaled with the desired mean and range vectors. Assume $f(C) \subset [a_0;b_0] \times [a_1;b_1] \times \ldots \times [a_p;b_p]$ with $a_0, \ldots, a_p, b_0, \ldots, b_p \in \mathbb{R}$.

$$m = \frac{1}{2}(a_0 + b_0, \; a_1 + b_1, \ldots, \; a_p + b_p)$$

and $$r = \frac{1}{2}(b_0 - a_0, \; b_1 - a_1, \ldots, \; b_p - a_p).$$

Then the output of the neural network is $m+r \odot \tanh(y)$, where y is the output of the last layer of the neural network.

The model may learn from the rules provided that any precondition of the rule is present in the dataset. Otherwise, the rule may be considered as satisfied by the model. The above solution may be similarly applied for other instances logic head 104.

The full multi-headed TNN system 200 model may be jointly trained with the combined loss function totalLoss=dataLoss+$\lambda_{loss}$·logicLoss where dataLoss is the loss function relative to the data head 202 and is represented by data loss function 212, and where logicLoss is the loss function relative to the logic head 204 and is represented by constraint loss function 230 incorporating constraints 234. The hyperparameter $\lambda_{loss}$ is similar to $\lambda$ described above.

In example TNN system 200, the logic head 204 uses the output of the data head 202 to map, using mapping 215, the data points: a data point may be mapped to the vector (S,dataHeadOutput), where S is the sensor data time trace. The mappings 215 function as a feedback path in which the logic head 204 receives a predicted output of the data head 202 while the logic head 204 processes the training data. For an example application with an autonomous vehicle, the following define oriented angles for the autonomous vehicle with respect to a track or road.

$$\begin{cases} a = -S['angleToTrack'], \\ b = S['steeringAngle'], \\ c = a + b = S['steeringAngle'] - S['angleToTrack'] \end{cases}$$

If the autonomous vehicle is close to the right edge of the road, the c>0 is preferable; if the car is on the left edge of the road, then c<0 is preferable. These safety preferences lead to the following are a set of constraints 234 for logic head 204 for an autonomous vehicle driving on a track:

$$\begin{cases} ifS['trackPosition'] < -0.75, \\ S['steeringAngle'] - S['angleToTrack'] > 0 \\ ifS['trackPosition'] > 0.75 \\ S['steeringAngle'] - S['angleToTrack'] < 0 \end{cases}$$

To implement the above constraints, a functional operator steeringAngle: C→[−1,1] is mapped to a small deep neural network. The rules are encoded using the real logic framework and define, for a given batch of data points and for each constraint, the truth values ruleClauseLeft and ruleClauseRight. An another added clause states that the output of steeringAngle for each element of the batch must be the ground truth value, which defines a truth value steeringClause. These clauses are aggregated using a weighted sum—the weight for steeringClause is fixed to 1, and the weight for each rule is a parameter to define using cross validation: $w_{rule}$. As a result:

$$logicLoss = \\ 1 - \frac{1}{1 + 2w_{rule}}(steeringClause + w_{rule}(ruleClauseLeft + ruleClauseRight))$$

Evaluation Metrics

The TNN system 200 model can be evaluated against the baseline (data head 202 without the logic head 204) on two different metrics:
(1) The MSE against the ground truth for steering angle prediction. This evaluates how well knowledge from data is integrated into the model.
(2) Using the logic head 204 rules (constraints 234). The goal is to evaluate how well the rules have been learned by the model. The driving state may be represented by a vector (I,S,A) where I is the front camera image, S is the numerical vector of the sensors, and A is the action vector. For a sequence of driving states $((I_1,S_1,A_1), \ldots, (I_L,S_L,A_L))$, where $A_1, \ldots, A_L$ is the prediction of the model, let $c_i = S_i['steeringAngle'] - S_i['angleToTrack']$ for each state. Note that $c_i$ should be negative when $S_i['trackPosition'] \geq 0.75$ (vehicle is near the left edge of the road) and positive when $S_i['trackPosition'] \leq -0.75$ (vehicle is near the right edge of the road). The danger metric of a trusted machine learning model may be defined as $$danger = \sum_{i=1}^{L} violationCost_i$$

where $violationCost_i$ is the cost of the $i^{th}$ data point violating a safety constraint. The cost may be proportional to $|c^i|$ if the $i^{th}$ data point violates a constraint, which results in the following danger measure:

$$danger = \sum_{\substack{i=1 \\ S_i['trackPosition'] \geq 0.75}}^{L} \max(c_i, 0) + \sum_{\substack{i=1 \\ S_i['trackPosition'] \leq -0.75}}^{L} -\min(c_i, 0)$$

Parameter Selection

Consider steeringLoss=1−steeringClause and ruleLoss=2−ruleClauseLeft−ruleClauseRight:

$$totalLoss = dataLoss + \frac{\lambda_{loss}}{w_{rule}} \cdot steeringLoss + \lambda_{loss} \cdot ruleLoss$$

To understand the influence of the $\lambda_{loss}$ parameter, $w_{rule}$ can be fixed and $\lambda_{loss}$ varied on both datasets, and check how MSE and danger metrics vary for the data head 202 and logic head 204 networks. The reported results may be computed using 5-fold cross-validation.

Figure 7:
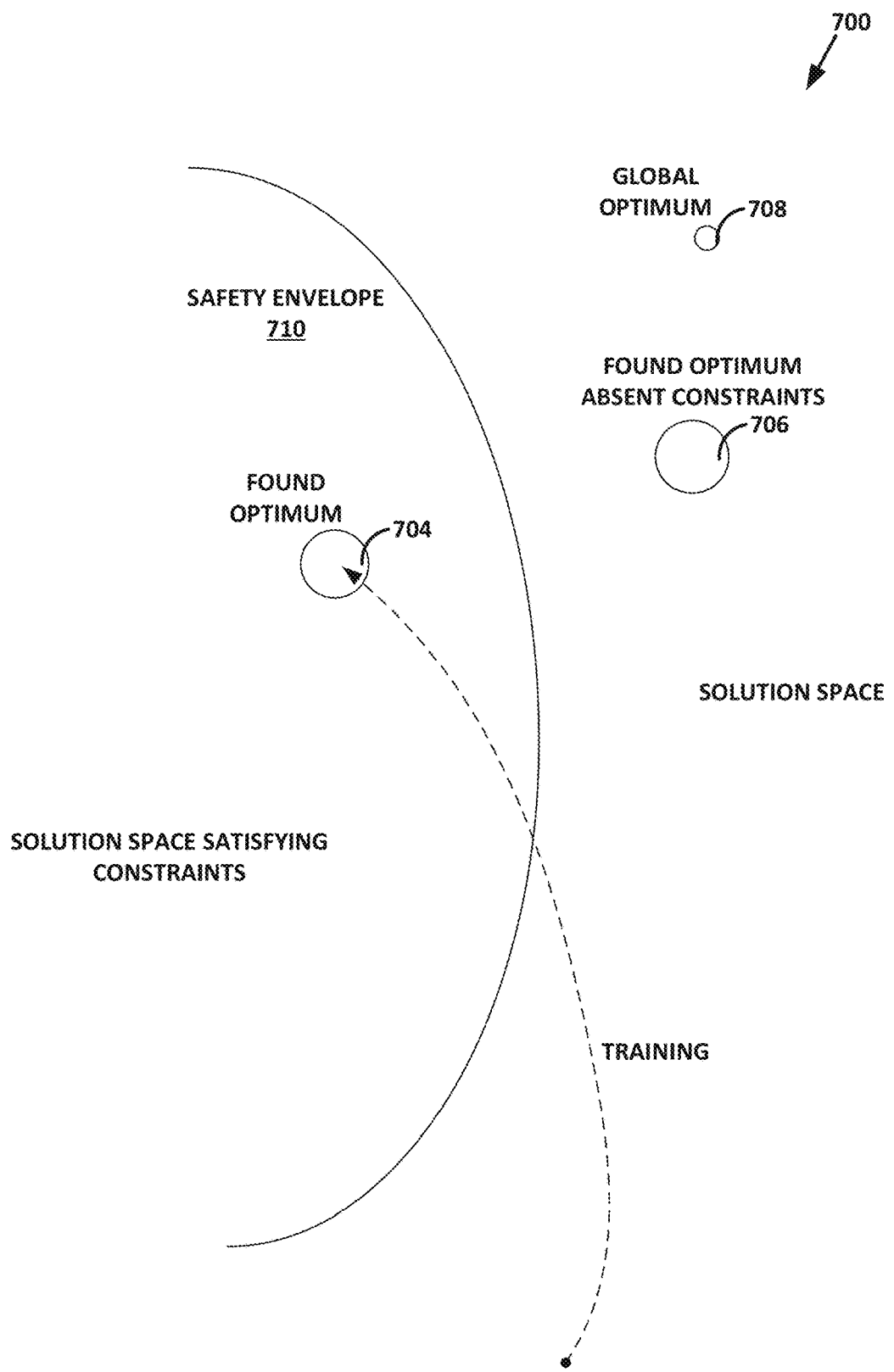
FIG. 7 is a conceptual diagram illustrates a training process by a trusted neural network system in which constraints enable logic-guided learning, according to techniques described herein.

FIG. 7 is a conceptual diagram illustrates a training process by a trusted neural network system in which constraints enable logic-guided learning, according to techniques described herein. Process 700 involves training TNN system 100 (or other TNN system described herein) toward a solution space that satisfies one or more logical constraints 134. The total solution space is a multi-dimensional space for training on the training data to optimize the combined objective function. Not all solutions for the solution space satisfy the logical constraints 134. Neither the global optimum 708 for the combined objective function nor the found optimum absent constraints 706 for the combined objective function satisfy the logical constraints 134. During training, the logic head 104 in some cases may propagate error using the feedback path 140 to the data head 102. Logic head 104 meeting logical constraints 134 therefore guides the training toward a found optimum 704 for the combined objective function that is within the solution space satisfying the constraints. Safety envelope 710 may correspond to a configurable threshold value for the constraints 134 that defines a level of trust that must be met in order for a solution or prediction to be satisfactory for TNN system 100.

Figure 8A:
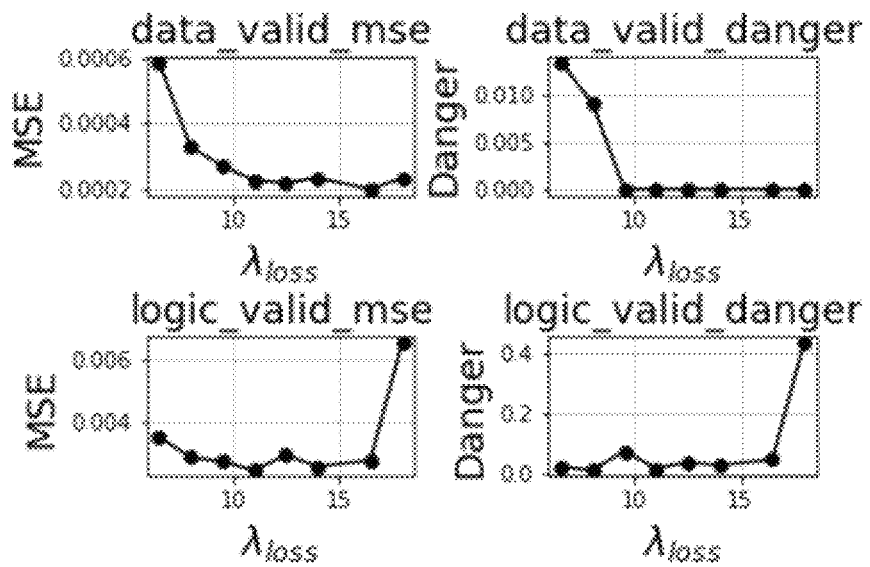
FIGS. 8A, 8B depict example results, according to techniques described herein.
Figure 8B:
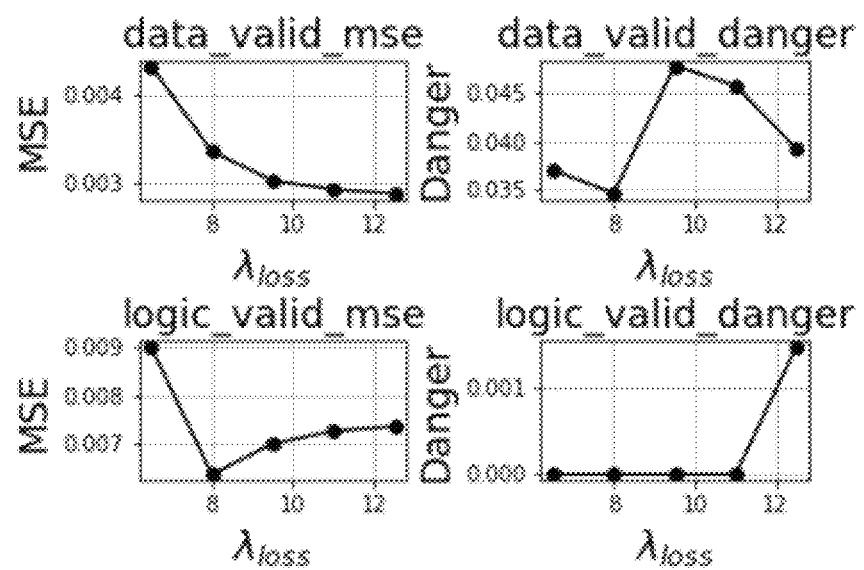

FIGS. 8A, 8B depict results for a dataset A and dataset B, respectively, and show the influence of the $\lambda_{loss}$ parameter on both metrics relative to the output of the data head 202 and the logic head 204. On dataset A having results depicted in FIG. 8A, increasing $\lambda_{loss}$ improves the data head 202 in terms of lowering both the MSE and danger metrics. However, when $\lambda_{loss}$ is too high, training becomes worse (especially for logic head 204), since the rule constraints become too strict to enforce.

On dataset B having results depicted in FIG. 8B, which is harder to fit, the data head 202 MSE is initially higher but the logic head 204 danger is lower—this means that even if the data is harder to fit, its completeness (i.e., more varied distribution of trackPosition) allows the overall model to better learn the rule. As $\mu_{loss}$ is increased, the MSE of the data head 202 improves but when it becomes too high, the logic head 204 loses in danger metric because the rules become too strict to enforce.

Overall, adding the rules to a neural network model, in accordance with techniques described herein, results in increased performance (lower MSE metric) and safety (lower danger metric), and the improvement increases with increasing importance of the safety constraints, i.e., increasing value of $\lambda_{loss}$ (unless the value becomes too high).

As described above with respect to TNN system 100, TNN system 200 may constrain neural network learning to a constrained solution space using gradient descent. Experimental results demonstrate the effectiveness of this technique. In a first experiment, consider a car moving on a left lane on a two lane road with an obstacle ahead in the lane. The ideal action for car would be to move to right lane, pass the obstacle on right lane and return back to left lane. The situation can be expressed as a state, action pair where state refers to the location of the car and action refers to steering left, steering right or moving straight. Consider states 0 to 4 are in the left lane (in straight line in order from left to right) and states 5 to 9 in the right lane. The obstacle is present at state 2 and so the car should steer to right lane before state 2 and steer back to left lane after state 7. The possible actions are 0: go straight, 1: go right and 2: go left. The optimal state-action pairs are as follows: 0→1, 1→1, 2→0, 3→0, 4→0, 5→0, 6→0, 7→0, 8→2, 9→2.

To generate noisy dataset, a probabilistic version of Markov Decision Process (MDP) version of this state action map may be used: at each state the car takes the optimal action with probability 0:8 and each other action with probability 0.1 each. Whenever the car runs into left curb (left turn from left lane) or runs into right curb (right turn from right lane) or runs into state 2, trace is restarted from state 0.

Consider a single hidden layer neural network with 10-dimensional input x as the input layer. State i is represented by $1_i$, a vector with 1 in $i^{th}$ position and 0s in every other position. The first hidden layer may consist of 5 neurons with sigmoid being the activation function. The next layer may consist of 3 neurons with output y being the softmax of these 3 neurons. The output represents the probability of each action, i.e., y(i) represents the probability of action i. The loss function considered is the cross-entropy loss. We consider the constraint that car should not take left turn from left lane and right turn from right lane. In other words, if $x=1_i$ with $i \leq 4$ then p(y(2))=0 and if $x=1_i$ with $i>4$ then p(y(1))=0. There are two sets of experiments: 1) without constraints, and 2) with constraints. As expected, when neural networks are trained using unconstrained method, the model does not suppress the probability of bad turns. For example, for state 0, the model still outputs a probability of around 0.1 for left turn, which is dangerous. In the second set of experiments, constrained training is used to train the model. An optimal value of the hyperparameter $\lambda$ may be found using grid search, but for this experiment, it is set to a constant value of 1.0. The trained model now suppresses the probability of bad turns to a low value. For example, for state 0, the model outputs a probability of 0:0093269. Note that this value can be reduced further by increasing value of $\lambda$.

A neural network may be fit to learn the function from sensorial data to steering angle, using a single hidden layer neural network with sensorial data from past 2 seconds as input, 10 hidden nodes and sigmoid as the activation function and output being the steer angle. Mean square error (MSE) may be the loss function. Consider the same safety constraints that were used in the logic head of the multi-headed TNN model as in the experiment described above. Here, the training data is not too noisy to result in dangerous steering angle, but it does result in constraints that help in reaching the optimal faster. The MSE of the constrained method is less than that of the unconstrained one, and it also converges faster.

As demonstrated by the above experiments for TNN system 200 in which two methods for incorporating logical constraints into neural networks are tested, TNN system 200 may facilitate higher trustworthiness in learning systems and can improve the efficiency of training.

In general, if the logical constraints 234 are non-temporal, a neural network model such as Logic Tensor Network (LTN) may be used to determine whether the logical constraints 324 are satisfied. In some cases of LTNs, the following objective function is minimized:

$$J(\Omega) = \sum_{i=1}^{N} \sum_{c=1}^{C} \max(0, 1 - g(T^{(i)}) + g(T_c^{(i)})) + \gamma \|\Omega\|_2^2$$

Here, $T^{(i)} = (e_1^{(i)}, R^{(i)}, e_2^{(i)})$ is the triple encoding the training data for relation R (modeled as a tensor in the network), $T_c^{(i)} = (e_1^{(i)}, R^{(i)}, e_c^{(i)})$ is a triple encoding "corrupt" training data. In this formulation, a user may generate corrupt training data that are small perturbations of the original training data. The main intuition is that the network should try to satisfy the real training examples but not the corrupt examples. The objective may include an $L_2$ regularizer of the network parameters.

In general, if the logical constraints 234 are temporal logic constraints, then a different formulation based on Signal Temporal Logic (STL) may be used for logic head 204. Temporal logic is a modal logic used to reason about time and to describe properties over time traces. In general, STL is a discrete linear time temporal logic used to reason about the future evolution of a continuous time behavior. A scalable gradient-based learning approach may be used to perform data-driven learning of STL formulae from positive example trajectories given an initial learning bias provided as a template formula. The signal temporal logic may be extended to probabilistic variants. There may be a neural network representation of STL formulae in logic head 204. For an autonomous vehicle application, for example, a specific example of STL constraint could be: "For all time, steering angle is above 0.2 means that speed is below 22 mph."

Figure 9:
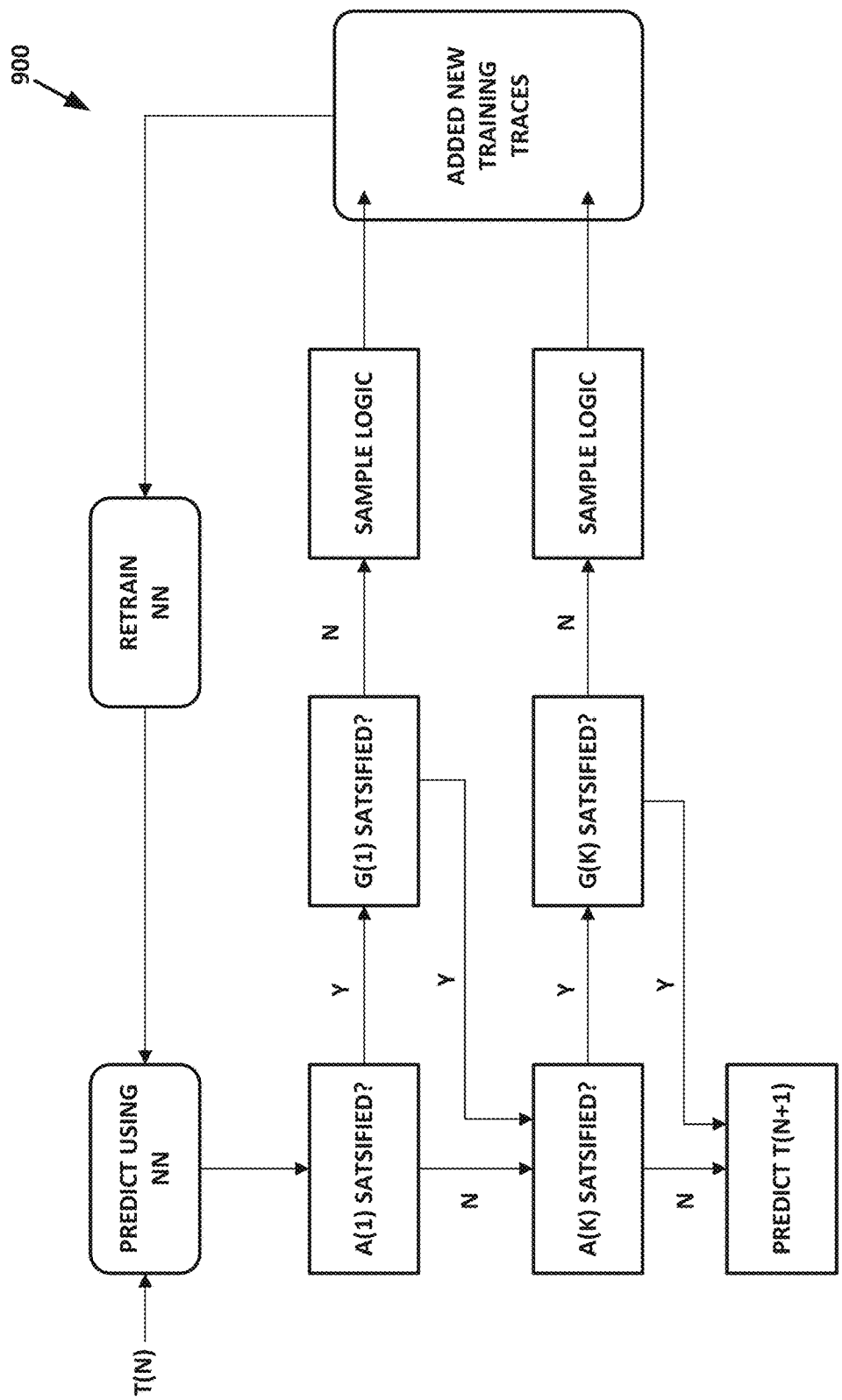
FIG. 9 illustrates an example process by a temporal logic reinforced neural network for a logic head to iteratively train on traces generated by sampling to guide the model toward satisfying the given temporal logic constraints, according to techniques described herein.

For rich logics where direct compilation to a neural network is infeasible, a machine learning model may be trained with logical formula through a logic-driven training approach. This technique may build on recent breakthroughs in the ability to uniformly (or nearly-uniformly) sample satisfiability models of logical formula. While these techniques have focused on Boolean satisfiability problem and satisfiability modulo theories (SMT) problems over integers, in some cases an encoding of signal temporal logic and its probabilistic variants to integer linear programming may permit a TNN system 200 to sample satisfying-traces from the temporal logic constraints in order to train the neural network model. Logic head 204 may check the satisfaction of the formulas and generate traces to train the network if the temporal logic constraints are not satisfied. Iteratively training on the traces generated by sampling guides the model towards satisfying the given temporal logical constraints. Note that this aspect of the TNN model can be one of the logic heads in the overall multi-headed TNN system 200. FIG. 9 illustrates an example process by a temporal logic reinforced neural network for a logic head to iteratively train on traces generated by sampling to guide the model toward satisfying the given temporal logic constraints.

Often a user has intuition about a logical rule but does not know the precise rule. In such cases, TNN system 200 learns the constraint from a template. For e.g., given a template of the form $X<\alpha \Rightarrow Y<\beta$, where X, Y are feature variables, TNN system 200 the values of the unknown parameters $\alpha$, $\beta$ from the data. These templates may be provided by the user as a "structural bias" in addition to the data, using which the user can provide meaningful constraints, e.g., safe driving principles, or laws of physics. TNN system 200 may learn the formula (e.g., in STL) from structural bias and data. Once the constraint of the formula is learned, it can be used in TNN system 200 for data-efficient learning as described above.

Figure 3:
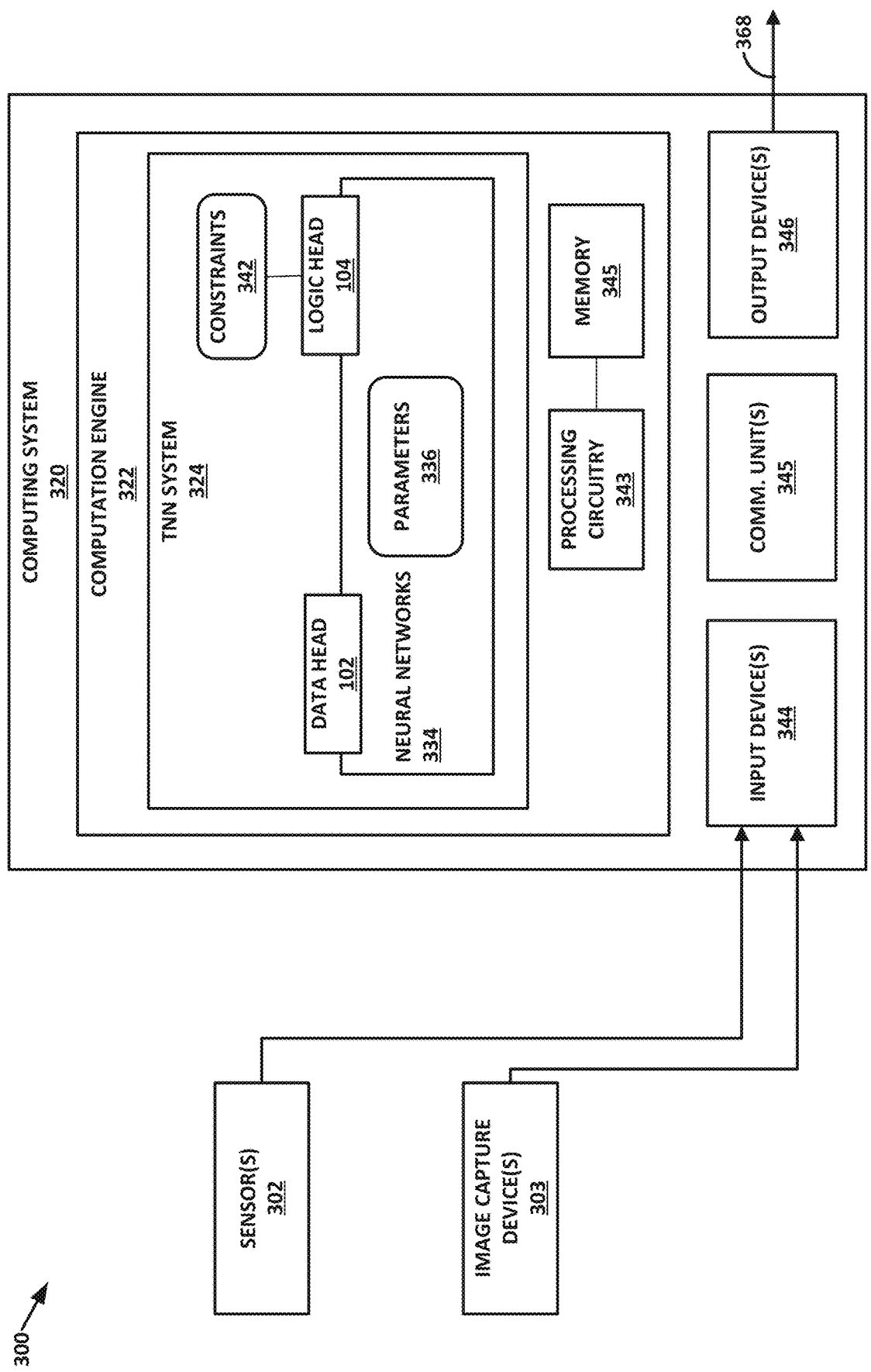
FIG. 3 is an example of a computing system, according to techniques of this disclosure.

FIG. 3 is an example of a computing system, according to techniques of this disclosure. Computing system 320 represents one or more computing devices configured for executing a TNN system 324, which may represent an example instance of any TNN system described in this disclosure.

Memory 345 may store information for processing during operation of computation engine 322. In some examples, memory 345 may include temporary memories, meaning that a primary purpose of the one or more storage devices is not long-term storage. Memory 345 may be configured for short-term storage of information as volatile memory and therefore not retain stored contents if deactivated. Examples of volatile memories include random access memories (RAM), dynamic random access memories (DRAM), static random access memories (SRAM), and other forms of volatile memories known in the art. Memory 345, in some examples, also include one or more computer-readable storage media. Memory 345 may be configured to store larger amounts of information than volatile memory. Memory 345 may further be configured for long-term storage of information as non-volatile memory space and retain information after activate/off cycles. Examples of non-volatile memories include magnetic hard disks, optical discs, floppy disks, Flash memories, or forms of electrically programmable memories (EPROM) or electrically erasable and programmable (EEPROM) memories. Memory 345 may store program instructions and/or data associated with one or more of the modules described in accordance with one or more aspects of this disclosure.

Processing circuitry 343 and memory 345 may provide an operating environment or platform for computation engine 322, which may be implemented as software, but may in some examples include any combination of hardware, firmware, and software. Processing circuitry 343 may execute instructions and memory 345 may store instructions and/or data of one or more modules. The combination of processing circuitry 343 and memory 345 may retrieve, store, and/or execute the instructions and/or data of one or more applications, modules, or software. Processing circuitry 343 and memory 345 may also be operably coupled to one or more other software and/or hardware components, including, but not limited to, one or more of the components illustrated in FIG. 3.

Computation engine 322 may perform operations described using software, hardware, firmware, or a mixture of hardware, software, and firmware residing in and/or executing at computing system 320. Computation engine 322 may execute each of the module(s) with multiple processors or multiple devices. Computation engine 322 may execute one or more of such modules as a virtual machine or container executing on underlying hardware. One or more of such modules may execute as one or more services of an operating system or computing platform. One or more of such modules may execute as one or more executable programs at an application layer of a computing platform.

One or more input devices 344 of computing system 320 may generate, receive, or process input. Such input may include input from a keyboard, pointing device, voice responsive system, video camera, biometric detection/response system, button, sensor, mobile device, control pad, microphone, presence-sensitive screen, network, or any other type of device for detecting input from a human or machine.

One or more output devices 346 of application server 240A may generate, transmit, or process output. Examples of output are tactile, audio, visual, and/or video output. Output devices 346 may include a display, sound card, video graphics adapter card, speaker, presence-sensitive screen, one or more USB interfaces, video and/or audio output interfaces, or any other type of device capable of generating tactile, audio, video, or other output. Output devices 346 may include a display device, which may function as an output device using technologies including liquid crystal displays (LCD), quantum dot display, dot matrix displays, light emitting diode (LED) displays, organic light-emitting diode (OLED) displays, cathode ray tube (CRT) displays, e-ink, or monochrome, color, or any other type of display capable of generating tactile, audio, and/or visual output. In some examples, computing system 320 may include a presence-sensitive display that may serve as a user interface device that operates both as one or more input devices 344 and one or more output devices 346.

One or more communication units 345 of computing system 320 may communicate with devices external to computing system 320 (or among separate computing devices of computing system 320) by transmitting and/or receiving data, and may operate, in some respects, as both an input device and an output device. In some examples, communication units 345 may communicate with other devices over a network. In other examples, communication units 345 may send and/or receive radio signals on a radio network such as a cellular radio network. Examples of communication units 345 include a network interface card (e.g. such as an Ethernet card), an optical transceiver, a radio frequency transceiver, a GPS receiver, or any other type of device that can send and/or receive information. Other examples of communication units 345 may include Bluetooth®, GPS, 3G, 4G, and Wi-Fi® radios found in mobile devices as well as Universal Serial Bus (USB) controllers and the like. Computation engine 322 executes TNN system 324. TNN system 324 includes a data head 102 and logic head 104 that each include one or more of neural networks 334 arranged in any of the manners described herein with respect to various instances of TNN systems. Neural networks 334 include respective sets of parameters 336.

TNN system 324 further includes constraints 324 for logic head 104. A user of TNN system 324 may configure constraints 324 using an interface, such as a graphical or command-line interface, or an application programming interface.

Input devices 344 are configured to receive electrical signal input from one or more sensors, such as sensor(s) 302 and image capture device(s) 303, and convert the electrical signal input into a form usable by computing system 320. For example, input devices 344 may include software or hardware configured to convert a received signal input from an analog signal to a digital signal. In another example, input devices 344 may include software or hardware configured to compress, decompress, transcode, encrypt, or decrypt a received signal input into a form usable by computing device 320. In another example, communication units 345 a network interface device to receive packetized data or other data representative of signals generated by sensor(s) 102 or images generated by image capture device(s) 303.

TNN system 324 may be configured in a learning mode to train on input data represented by data from sensor(s) 302 and image capture device(s) 303. A trained TNN system 324 model may be used to generate predicted outputs. TNN system 324 may provide predicted outputs to output device(s), which output predicted output 368.

Although described as being implemented using neural networks in the example of FIG. 3, TNN system 324 may also or alternatively apply other types of machine learning to train one or more models for trusted operations. For example, TNN system 324 may apply one or more of nearest neighbor, näive Bayes, decision trees, linear regression, support vector machines, neural networks, k-Means clustering, Q-learning, temporal difference, deep adversarial networks, or other supervised, unsupervised, semi-supervised, or reinforcement learning algorithms to train one or more models for trusted operations.

Figure 4:
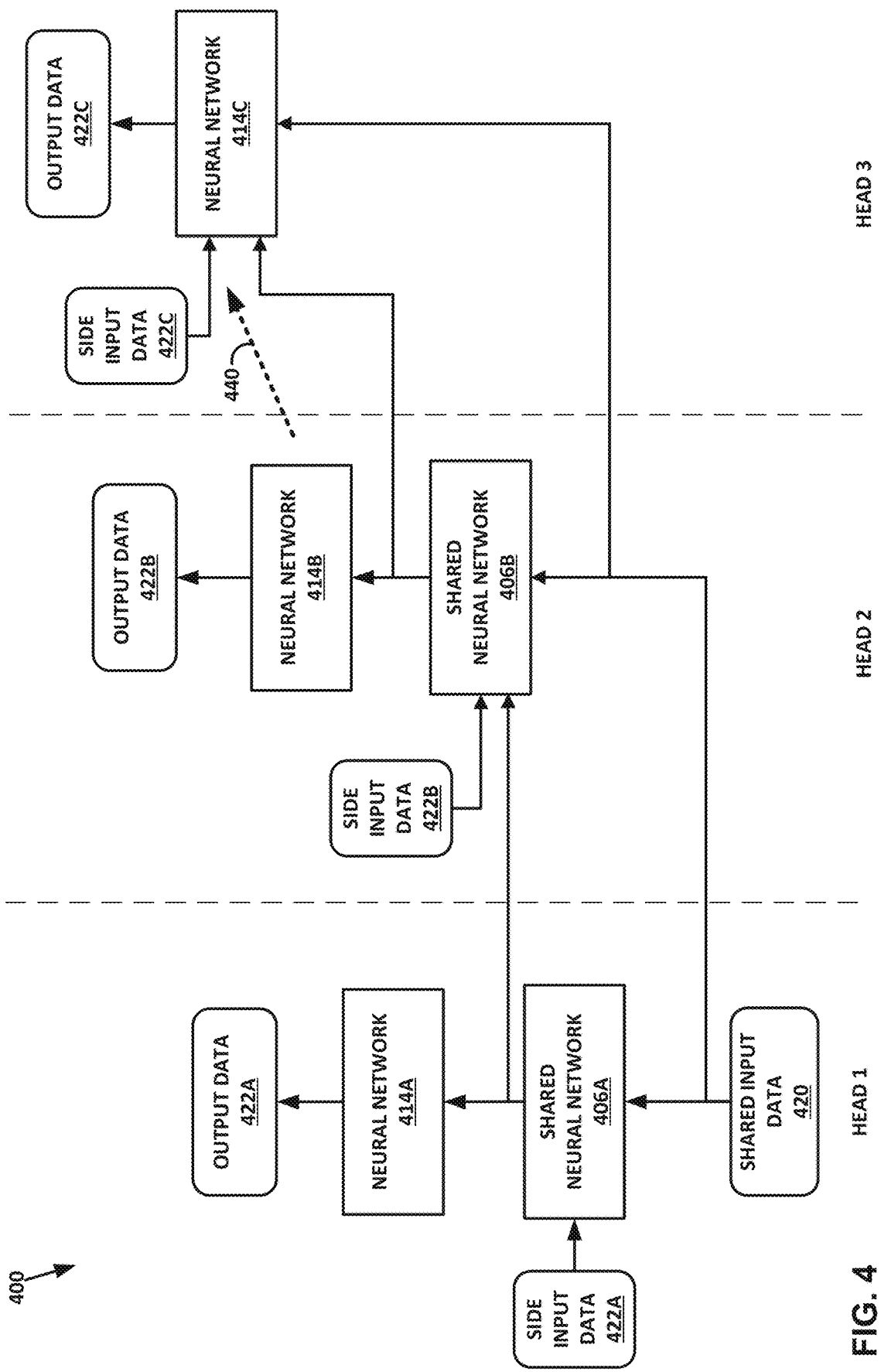
FIG. 4 is a block diagram illustrating a conceptual diagram of a multi-headed, trusted neural network according to techniques of this disclosure.

FIG. 4 is a block diagram illustrating a conceptual diagram of a multi-headed, trusted neural network according to techniques of this disclosure. In this example, TNN system 400 has three heads. Each head has at least one dedicated neural network 414A-414C and shared at least one shared neural network 406A-406B with another head. The shared neural networks 406 thus obtain gradient updates from multiple heads. Neural networks 414 may encode different higher-level features. For example, for an autonomous vehicle operation, neural network 414C may encode constraints on higher-level features, e.g., a "sharp turn" encoding for a higher-level feature of "when taking a sharp turn."

Each of shared neural networks 406 processes, as input data, a corresponding dedicated side input data 422A-422B. Shared input data 420 may be input data for one or more of the heads. In this example, shared input data 420 is input data for all three heads. Side inputs 422 may each come from a different source, such as a sensor or image capture device. For example, side input 422B may include data generated by a range-finder or by object-detection software that detects objects within images.

Each of the heads may represent an instance of a logic head or a data head. TNN system 400 may include two logic heads and one data head, or one logic head and two data heads. Each of the heads may represent an example instance of logic head 104 or data head 102 of FIG. 1. However, the specific arrangement of neural networks, inputs, and heads of TNN system 400 differs from TNN system 100. TNN system 400 may include a feedback path 440 by which a logic head comprising, in some examples, neural network 414C receives a predicted output of a data head comprising, in some example, neural network 414B. In some examples, a similar feedback path may also, or alternatively, be configured with a feedback path from neural network 414A to neural network 414B.

Figure 5:
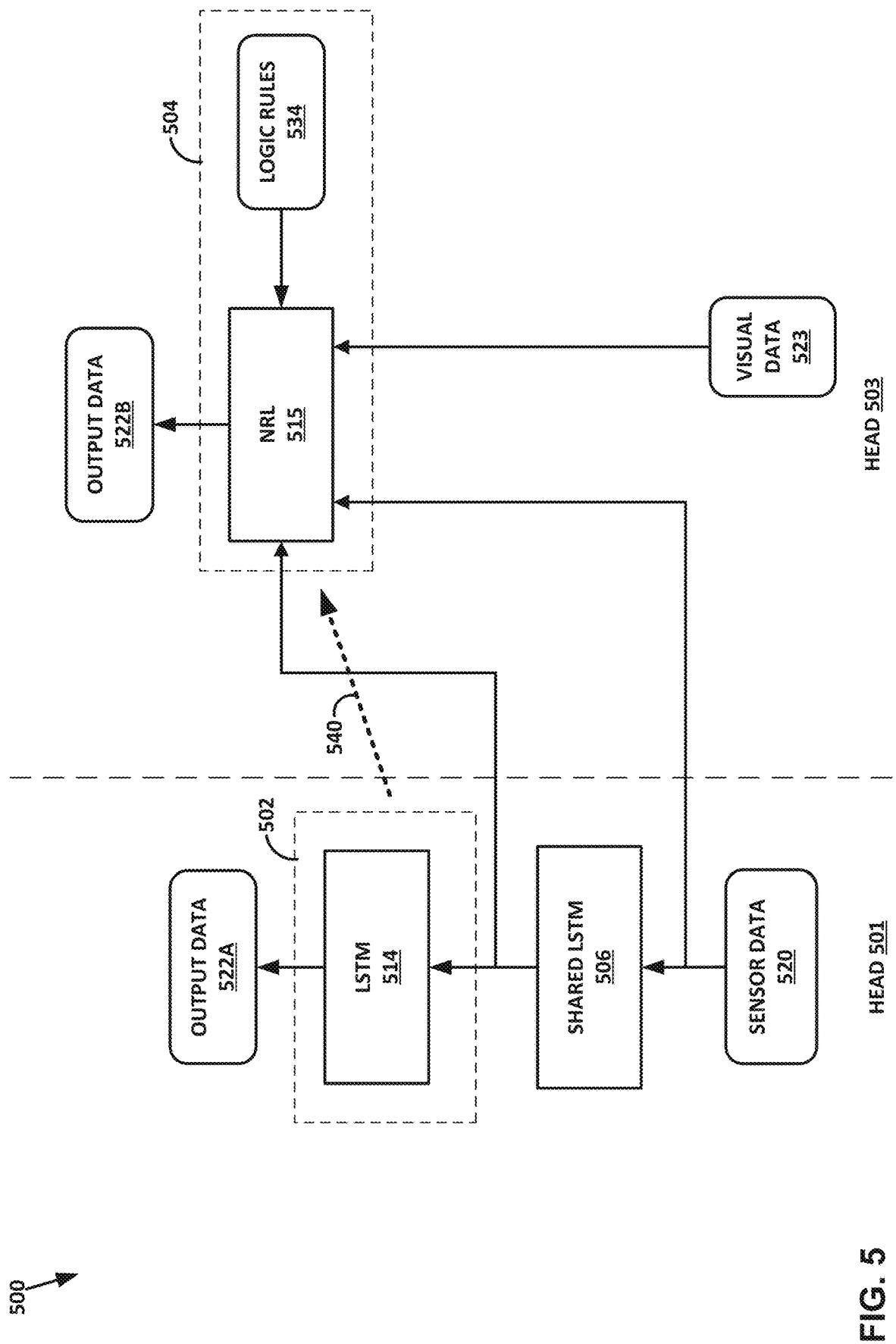
FIG. 5 is a block diagram illustrating a conceptual diagram of a multi-headed, trusted neural network according to techniques of this disclosure.

FIG. 5 is a block diagram illustrating a conceptual diagram of a multi-headed, trusted neural network according to techniques of this disclosure. TNN system 500 may represent an example of TNN system 200, with LSTM 514 an example instance of neural network 114, NRL 515 representing an example instance of neural network 134, and logic rules 534 representing example constraints 134.

The logic constraint heads of the TNN system 500 model can be neural nets that determine whether different types of logical constraints are satisfied. For example, to enforce that a vehicle takes turns at low speeds by creating a temporal constraint represented in logic rules 534, which that specifies that whenever we the vehicle is in a turn (e.g., steering angle is high), the car should be going at a low speed.

For TNN system 500, the data head 502 trains from the non-image data 520, while the logic head 504 has a Neural Rule Learning (NRL) layer 515, which may include a CNN layer to detect "turn" from visual data 523.

In some examples, TNN system 500 includes a feedback path 540 in which logic head 503 is configured to receive a predicted output of the data head 501 for use by the logic head 503 to process sensor data 520 and/or visual data 523 using the logic rules 534. In this way, error based on differences between the predicted outputs and the true outputs may be directly propagated between the logic head 503 and the data head 501. The predicted output of data head 501 may include data from output data 522A that is mapped to data points in logic rules 534, mapped to one or more of parameters of NRL 515, one or more data points having values represented in sensor data 520, and/or one or more data points having values represented in visual data 523.

Figure 6:
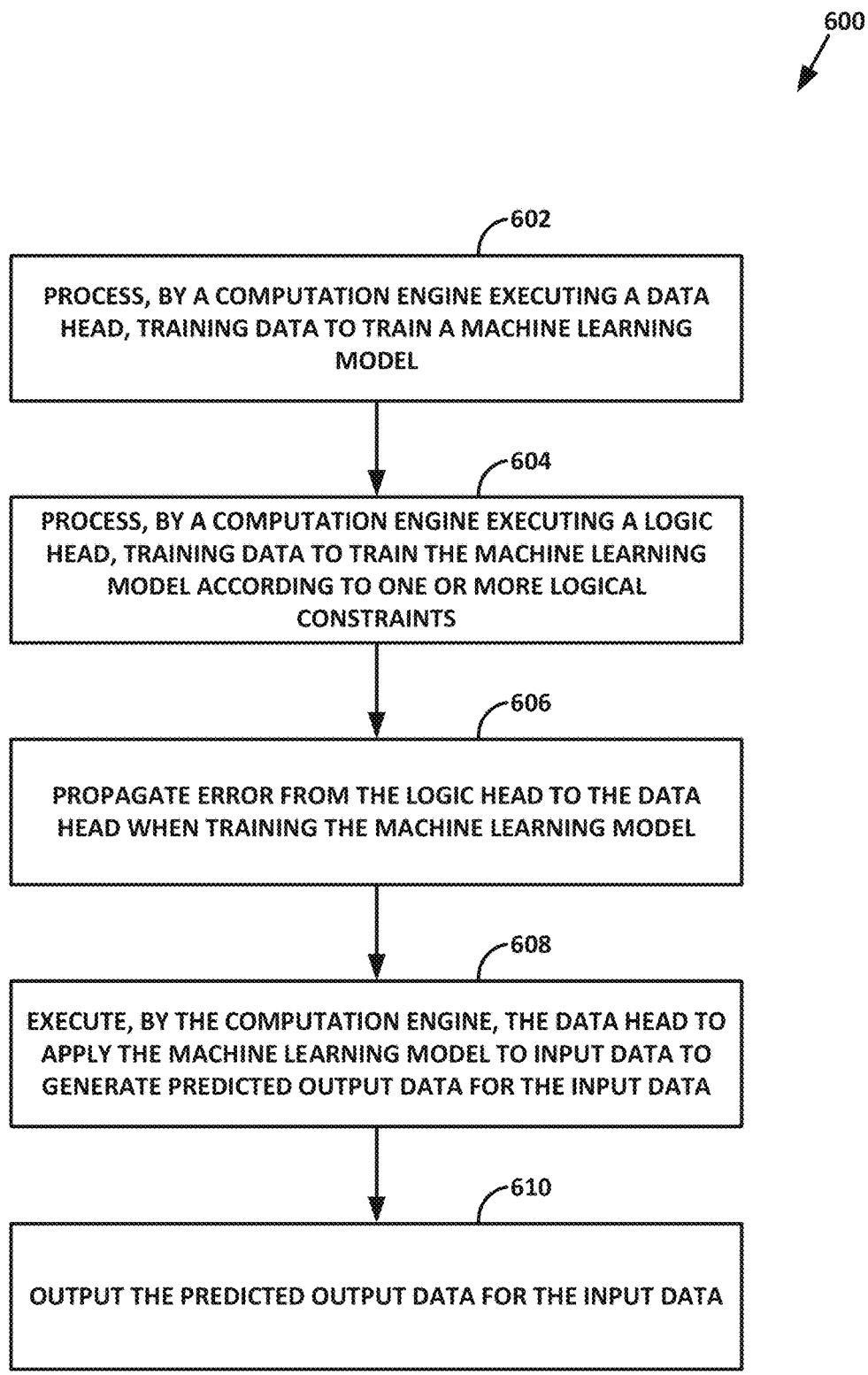
FIG. 6 is a flowchart illustrating an example mode of operation for a trusted neural network system, according to techniques described in this disclosure.

FIG. 6 is a flowchart illustrating an example mode of operation for a TNN system, according to techniques described in this disclosure. Although described with respect to computing system 320 of FIG. 3 having a computation engine 322 that executes TNN system 324, mode of operation 600 may be performed by a computation system with respect to other examples of TNN systems described herein.

In mode of operation 700, computation engine 322 executes data head 102 to process training data to train a machine learning model for TNN system 324 (602). Computation engine 322 also executes logic head 104 to process training data to train a machine learning model for TNN system 324, according to one or more logical constraints 342 (604). Logic head 104 may propagate error to the data head 102 using the feedback path 140 when training the machine learning model (606). Propagating error in this way may constrain outputs of the machine learning model to a constrained solution space defined by the one or more logical constraints 342.

The model may approach a found optimum that meets the logical constraints 342 and is within the constrained solution space. Computation engine 322 executes the data head to apply the trained machine learning model to input data to generate predicted output for the input data (608), which output devices 346 may output as output data 368.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

What is claimed is:

1. A trusted neural network system comprising:
   a data head comprising a first neural network, the data head configured to process training data using the first neural network to train a machine learning model;
   a logic head comprising a second neural network, the logic head configured to process output from a shared neural network using the second neural network to train the machine learning model according to one or more logical constraints,
   the shared neural network shared between the data head and the logic head and configured to process the training data to train the machine learning model,
   wherein the logic head is configured to propagate error directly to the data head using a feedback path between the logic head and the data head to constrain the machine learning model to a constrained solution space defined by the one or more logical constraints,
   wherein outputs of the shared neural network are inputs to the first neural network of the data head and the second neural network of the logic head, when training the machine learning model, to constrain outputs of the machine learning model to the constrained solution space for the machine learning model; and
   a computation engine comprising processing circuitry for executing the data head and the logic head to train the machine learning model to produce one or more results that have exceeded a threshold value,
   wherein the computation engine is configured to execute the data head to apply the machine learning model to input data to generate predicted output for the input data, and
   wherein the computation engine is configured to output the predicted output for the input data.

2. The trusted neural network system of claim 1, wherein the feedback path is configured such that the logic head is configured to receive a predicted output of the data head while the logic head processes first training data of the training data, the first training data associated with the set of the logical constraints.

3. The trusted neural network system of claim 1,
   wherein the computation engine is configured to train the data head to optimize a data loss function for minimizing error between the outputs of the machine learning model and the true outputs for the training data, and
   wherein the computation engine is configured to train the logic head to optimize a constraint loss function for constraining the outputs of the machine learning model to the constrained solution space.

4. The trusted neural network system of claim 3, wherein to train the machine learning model the computation engine is configured to jointly train the data head and the logic head with a combined loss function that combines the data loss function and the constraint loss function.

5. The trusted neural network system of claim 4, wherein a constraint significance hyperparameter is configured to determine a relative significance of the constraint loss function in the combined loss function.

6. The trusted neural network system of claim 4, wherein, to train the machine learning model, the data head and the logic head are configured to use one or more of: (1) gradient descent or (2) proximal gradient descent to propagate error.

7. The trusted neural network system of claim 3,
   wherein the data loss function comprises parameters of the first neural network and the shared parameters of the shared neural network, and
   wherein the constraint loss function comprises parameters of the second neural network and the shared parameters of the shared neural network.

8. The trusted neural network system of claim 1,
   wherein the computation engine is configured to determine gradients for the second neural network of the logic head by determining whether, for all data in the training data, the one or more logical constraints are satisfied by the data, and
   wherein the computation engine, based on the determined gradients, propagates the gradients for the second neural network of the logic head to the first neural network of the data head and to the shared neural network.

9. The trusted neural network system of claim 1, wherein the second neural network comprises one or more Logic Tensor Networks that output indications of whether, for all data in the training data, the one or more logical constraints are satisfied by the data.

10. The trusted neural network system of claim 1,
    wherein the one or more logical constraints comprise respective temporal logic constraints that each specifies a constraint for a continuous time behavior represented in input data, and
    wherein the one or more logical constraints are encoded using Signal Temporal Logic.

11. The trusted neural network system of claim 10,
    wherein the computation engine is configured to execute the logic head to apply the one or more temporal logic constraints to sample traces from the one or more logical constraints to identify traces that do not satisfy the temporal logic constraints, and wherein the computation engine is configured to execute the logic head to train the second neural network using the traces that do not satisfy the temporal logic constraints.

12. The trusted neural network system of claim 1, wherein the training data comprises first training data and second training data that is separate from the first training data,
wherein the computation engine is configured to train the data head with the first training data, and
wherein the computation engine is configured to train the shared neural network with the second training data.

13. The trusted neural network system of claim 1, wherein the training data comprises first training data and second training data that is separate from the first training data,
wherein the computation engine is configured to train only one of the data head and the logic head with the first training data, and
wherein the computation engine is configured to train the shared neural network with the first training data and the second training data.

14. The trusted neural network system of claim 1, wherein the training data comprises first training data and second training data that is separate from the first training data,
wherein the computation engine is configured to train the data head with the first training data, and
wherein the computation engine is configured to train the logic head with the first training data and the second training data.

15. The trusted neural network system of claim 1, wherein the system comprises one of an autonomous vehicle system, a healthcare system, a financial system, a cybersecurity system, or a robotic system.

16. The trusted neural network system of claim 1, wherein the training data comprises first training data comprising a sequence of images and second training data comprising sensor data.

17. The trusted neural network system of claim 1,
wherein the system comprises an autonomous vehicle system,
wherein the shared neural network is configured to process sensor data from one or more sensors, the sensor data indicative of at least one of operations and an environment of the autonomous vehicle system,
wherein the data head is configured to process visual data from an image capture device, the visual data indicative of an environment for the autonomous vehicle system,
wherein the predicted output for the sensor data and the visual data comprises a steering angle for the autonomous vehicle system.

18. A method comprising:
processing, by a data head of a trusted neural network system, training data using a first neural network to train a machine learning model, wherein the data head comprises the first neural network;
processing, by a logic head of the trusted neural network system, output from a shared neural network using a second neural network to train the machine learning model according to one or more logical constraints,
the shared neural network shared between the data head and the logic head and configured to process the training data to train the machine learning model,
wherein the logic head is configured to propagate error directly to the data head using a feedback path between the logic head and the data head to constrain the machine learning model to a constrained solution space defined by the one or more logical constraints,
wherein outputs of the shared neural network are inputs to the first neural network of the data head and the second neural network of the logic head, when training the machine learning model, to constrain outputs of the machine learning model to the constrained solution space for the machine learning model;
applying, by the data head, the machine learning model to input data to generate predicted output for the input data; and
outputting, by the trusted neural network system, the predicted output for the input data.

19. A computing system comprising:
a memory; and
one or more processors coupled to the memory, wherein the one or more processors are configured to:
process, with a data head, training data using a first neural network to train a machine learning model, wherein the data head comprises the first neural network;
process, with a logic head, output from a shared neural network using a second neural network to train the machine learning model according to one or more logical constraints, the shared neural network shared between the data head and the logic head and configured to process the training data to train the machine learning model,
wherein the logic head is configured to propagate error directly to the data head using a feedback path between the logic head and the data head to constrain the machine learning model to a constrained solution space defined by the one or more logical constraints,
wherein outputs of the shared neural network are inputs to the first neural network of the data head and the second neural network of the logic head, when training the machine learning model, to constrain outputs of the machine learning model to the constrained solution space for the machine learning model;
apply, with the data head, the machine learning model to input data to generate predicted output for the input data; and
output, with the trusted neural network system, the predicted output for the input data.

* * * * *